R. HAUPT.
VEHICLE SPRING.
APPLICATION FILED JULY 13, 1914.
1,156,996.
Patented Oct. 19, 1915.
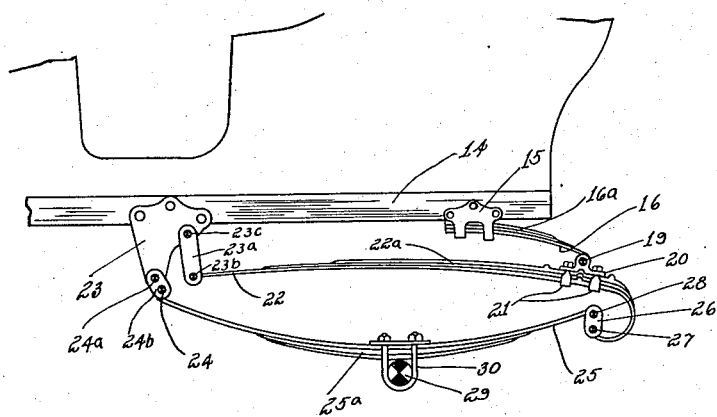
WITNESSES:
J. B. Webster
F. M. Blanchard
INVENTOR.
Rudolph Haupt
BY
Jerry S. Webster
ATTORNEY

UNITED STATES PATENT OFFICE.

RUDOLPH HAUPT, OF FRESNO, CALIFORNIA.

VEHICLE-SPRING.

1,156,996.  Specification of Letters Patent.  Patented Oct. 19, 1915.

Application filed July 13, 1914. Serial No. 850,662.

*To all whom it may concern:*

Be it known that I, RUDOLPH HAUPT, a subject of the Empire of Germany, residing at Fresno, in the county of Fresno and State of California, have invented certain new and useful Improvements in Vehicle-Springs; and I do declare the following to be a clear, full, and exact description of the same, reference being had to the accompanying drawings, and to the characters of reference marked thereon, which form a part of this application.

This invention relates to improvements in springs used in connection with all manner of vehicles and is adapted particularly for use with motor vehicles which are adapted to travel at high speed under all kinds of road conditions, the object of the invention being to provide a spring which will sustain the vehicle in a sufficient manner and at the same time compensate for and overcome the jolts and jars of the road surfaces and act as a shock absorber, whereby such jolts and jars will not be felt by the occupants of the vehicle.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

The figure of the drawings is a side elevation showing the application of my improved spring to the vehicle.

Referring now more particularly to the characters of reference on the drawings, the numeral 14 designates the frame of the vehicle and fastened thereto by means of a clamp 15 is a spring 16 with supporting leaves 16$^a$. The spring 16 is pivotally mounted on a pin 19 carried by a bracket 20 fastened to a spring 22 and 22$^a$ by means of clamps 21. The spring 22 and 22$^a$ is pivotally connected to the bracket 23 of the frame by means of a link 23$^a$ with pins 23$^b$ and 23$^c$.

The spring 25 and 25$^a$ is fastened to the vehicle by means of the bracket 23 and pivotally connected by means of the pins 24 and 24$^a$ with the links 24$^b$ and at its other extreme end, connected to the above spring 22 and 22$^a$ by means of links 26 and pins 27 and 28. To the spring 25 and 25$^a$ is fastened the axle 29 by means of a clamp 30. By means of this structure, the weight of the vehicle is carried equally by the two springs and all shocks and jars are greatly reduced in force by the time they are transmitted to the vehicle through the medium of the adjacent spring 16—16$^a$.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention as defined by the appended claims.

Having thus described my invention what I claim as new and useful and desire to secure by Letters Patent is:—

1. A device of the character described comprising the combination with a vehicle, of a spring member clamped to the axle of said vehicle, one end of said spring member being flexibly connected with the frame of said vehicle, another spring flexibly connected with the other end of said first named spring, the other end of said second named spring being flexibly connected with said vehicle independently of said first named spring, and a short auxiliary spring pivotally connected to said second named spring at one end and clamped to said vehicle at its other end, as described.

2. A device of the character described comprising the combination with a vehicle. of a spring clamped to the axle of the vehicle, one end of said spring being flexibly connected with the frame of said vehicle, another spring flexibly connected with the other end of said first named spring at one end and with the frame of said vehicle at the other end, a clamp adjustably secured to said second named spring, and a third spring having one end clamped to the frame of said vehicle and the other end pivotally mounted on said clamp, as described.

In testimony whereof I affix my signature in presence of two witnesses.

RUDOLPH HAUPT.

Witnesses:
W. O. WATTERS,
R. F. GEORGE.

Copies of this patent may be obtained for five cents each, by addressing the "Commissioner of Patents, Washington, D. C."